(12) United States Patent
Steinberg

(10) Patent No.: US 6,341,540 B2
(45) Date of Patent: *Jan. 29, 2002

(54) CLIPLESS PEDAL

(76) Inventor: John Douglas Steinberg, 320 Lake St. #304, Huntington Beach, CA (US) 92648

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/287,025

(22) Filed: Apr. 6, 1999

(51) Int. Cl.⁷ .................................................. B62M 3/08
(52) U.S. Cl. ..................................................... 74/594.6
(58) Field of Search .......................... 74/594.6, 594.4; 36/131

(56) References Cited

U.S. PATENT DOCUMENTS

| | | |
|---|---|---|
| 590,685 A | 9/1897 | Matthews |
| 595,388 A | 12/1897 | Hanson |
| 599,619 A * | 2/1898 | Matthews .................. 74/594.6 |
| 4,942,778 A | 7/1990 | Bryne |
| 5,003,841 A | 4/1991 | Nagano |
| 5,046,382 A | 9/1991 | Steinberg |
| 5,203,229 A | 4/1993 | Chen |
| 5,325,738 A | 7/1994 | Bryne |
| 5,546,829 A | 8/1996 | Bryne |
| 5,606,894 A | 3/1997 | Bryne |
| 5,685,202 A | 11/1997 | Chen |
| 5,697,262 A | 12/1997 | Chen |

FOREIGN PATENT DOCUMENTS

| | | | |
|---|---|---|---|
| EP | 0428140 | 3/1995 | |
| EP | 0568109 | 6/1996 | |
| EP | 0569048 | 9/1996 | |
| EP | 0576042 | 6/1998 | |
| GB | 20289 | * 12/1895 | ................ 74/594.6 |
| WO | WO96/22912 | 8/1996 | |

OTHER PUBLICATIONS

Bebop Incorporated, 2–page flyer, Sep. 1998.
Mountain Bike Action Magazine, "Post–Modern Pedal Push–Off," May 1996, pp. 100, 101, 103, and 104.
Translation of claims of WO96/22912, Irlbacher, Aug. 1, 1996.

* cited by examiner

Primary Examiner—Mary Ann Green

(57) ABSTRACT

A bicycle pedal system including a cleat attached to a rider's shoe, and a pedal including a pedal body and, in one embodiment, two spring plates, each formed from spring-tempered steel and shaped with a flat portion attached to the pedal body and arms extending to form the mechanisms for clamping both edges of the cleat engaging the opposite side of the pedal. Using spring-tempered steel allows the clamping mechanism itself to flex.

19 Claims, 4 Drawing Sheets

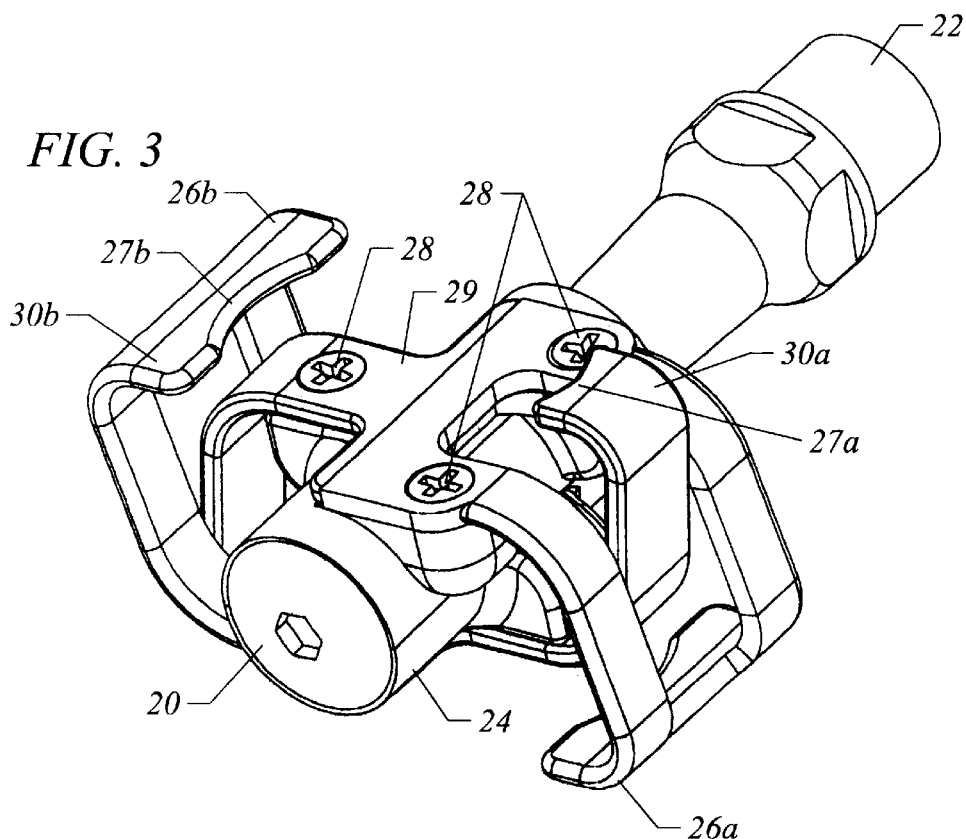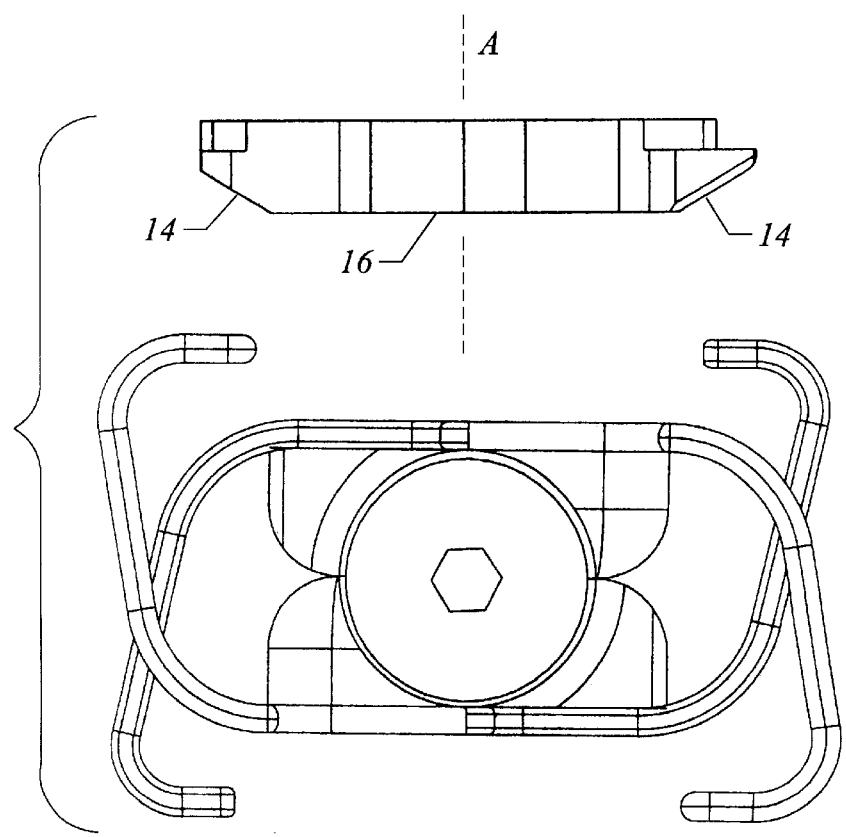

CLIPLESS PEDAL

FIELD OF THE INVENTION

The invention relates to an improved clipless pedal for attaching an appropriate cleat on a bicycle rider's shoe to the pedal. More particularly, it reduces the weight, complexity and cost of manufacture while improving performance of existing pedal systems by making the spring that retains the shoe-mounted cleat itself the complete cleat retention mechanism on the pedal.

BACKGROUND OF THE INVENTION

Clipless pedals are a popular and effective method of attaching a bicycle rider's feet to a bicycle crankarm. Such pedals generally consist of a component attached to the rider's shoe and another on the pedal, one of which is spring-loaded. With most clipless pedals, riders enter the mechanism by stepping down and exit by twisting the foot.

A large number of clipless pedal designs have been marketed over the last ten years. A large percentage of these have been based on the "SPD" design first marketed by Shimano starting around 1990. This system consists in its most basic aspects of (i) a small metal cleat attached to the cyclist's shoe, (ii) two clamps mounted to the body of the pedal and shaped to clasp the front and rear edges of the cleat, at least one of which is mounted on so that it pivots about an axis defined by a screw or rod and is biased by a coiled spring, and (iii) a steel plate mounted to the pedal body upon which the cleat rests once it is engaged in the pedal by the clamps. In the case of symmetrically two-sided pedals, which are commonly used in off-road riding on mountain bikes, there are two sets of these components, one set on each of the top and bottom surfaces of the pedal.

A large number of variations on this basic architecture have been produced. The vast majority of these have used helically coiled steel springs mounted on shafts as the spring mechanism. These springs, along with the hardware and reinforcements required to locate, support and translate forces from one plane to another, add considerable weight, complication and expense to these designs. Most such designs include 4 such springs. In the case of off-road pedals, where mud-clearing is a major consideration, these additional components also add bulk and reduce the ability of the system to shed mud, thus making it more difficult to use the system in challenging conditions, especially if the rider is focused on racing or challenging off-road conditions.

The first SPD system marketed by Shimano allowed both the front and rear clamping means to pivot. This allowed the rider to step straight down into the pedal, as the camming surfaces on the cleat would interact with the clamping mechanisms to open the mechanisms sufficiently to allow the cleat to pass straight downward into the "in" position. The two clamps would then spring back into the closed position, holding the cleat in place until the rider exited by twisting his foot. Because these pedals, like nearly all off-road pedals, are symmetrically two-sided, each pedal thus had four pivoting clamps mounted on two separate shafts. The additional moving parts and related support structure required to allow this movement added considerable weight, cost and complexity.

In order to reduce weight and complexity, most current designs pivot only the rear clamping means. The front clamping means is generally fixed relative to the pedal body. This means that the rider generally cannot step straight down into the pedal, but must begin the engagement motion by starting with the foot behind the correct position, push the front edge of the cleat into the front clamping means by sliding the foot forward, and then step downward. This two step process makes entry more difficult and less reliable.

One prior design, the Onza pedal system, used two flat steel plates in place of the pivoting clamps. These plates had small windows into which the engaging means of the cleat were inserted, and the plates were urged toward the engaging position by elastomers. Like the first SPD pedal system, the Onza allowed both the front and rear engaging means to move relative to the cleat. Though simpler and lighter than the standard SPD design, the Onza design required a bulky pedal body to mount the separate steel plates and elastomers, and was less effective than the standard pedal because elastomers proved to be less desirable as a spring means.

More recently, the Kore pedal has combined certain features of the Onza pedal, such as the flat rear plate engagement means and elastomer spring, with a more traditional fixed engaging means on the front of the mechanism. As with the instant invention, the clamping means are integral with the cleat plate. However, because the front engaging means is fixed, the Kore pedal does not allow true step-down entry. The configuration of the clamping means does not permit both ends of the engaging means to move relative to the cleat. The Kore pedal also uses elastomers as part of their retention means.

It is an object of the present invention to provide a simpler pedal design that is easier to manufacture and assemble. It is another object of the present invention to provide a pedal design that is lighter in weight. It is a further object of the invention to provide a design with superior performance in dirty environments. It is a further object of the present invention to provide a design that allows step-down entry without a weight penalty. These and other advantages of the present invention will be evident to one of ordinary skill in the art in the following description.

SUMMARY OF THE INVENTION

The invention involves a unique pedal, which employs a particular type of spring plate or clamp, and which preferably interacts with a relatively conventional cleat to attach the shoe and foot of a rider to the drank arm of a relatively conventional bicycle. Thus, aspects of the invention concern the spring plate, the pedal, the pedal and clip, and the bicycle with such a pedal, as will be apparent from the following summary of the invention.

The pedal of the invention includes a body with opposed sides, one being referred to as the top and the other the bottom. A generally C-shaped spring plate has a mid portion for attachment to one side of the pedal body, and arms extending from generally opposite ends of the mid portion about the pedal body to terminate in end portions that lie generally in a plane somewhat beyond the other side of the body. The end portions are shaped to removably receive and hold a cleat attached to a bike rider's shoe.

Preferably the pedal body includes two such spring plates, the plates being attached to opposed sides of the body and their arms being shaped and located to clear one another and lie in a plane spaced from the spring plate on the other side. Thus, by such an arrangement the rider can engage a cleat on his shoe with a spring plate on the pedal body, thereby to power a bicycle. Also, preferably the arms of the spring plate include two arms on one side and one arm on the other side, the two arms being spaced sufficiently to allow the single arm of the opposed spring plate to pass between them. The arms are sufficiently resilient to allow the cleat to cam them apart as the rider steps his cleat into engagement with the pedal, but sufficiently rigid to resist removal of the clear during normal pedaling of the bicycle.

Preferably the end portions of the spring plate are shaped to cooperate with appropriately shaped portions of the cleat to allow the rider to cam the cleat into engagement with the pedal by stepping onto the pedal, and to allow the rider to disengage the cleat form the pedal by twisting the cleat out of the pedal. In another embodiment a window is provided in the end portion for this purpose. A tension plate may be added to adjust the resiliency of the spring plate if desired.

BRIEF DESCRIPTION OF THE DRAWINGS

FIG. 3 is a perspective view of an embodiment of the subject pedal.

FIG. 4 is a side view of an embodiment of the subject pedal and cleat.

DETAILED DESCRIPTION

The invention solves each of the noted limitations in the existing art. The subject invention omits the standard coiled springs or elastomers and attendant hardware from standard SPD pedals. Instead, in the preferred embodiment, it uses spring-tempered steel to form the cleat plates, and uses extensions of each cleat plate to form the mechanisms for clamping both edges of the cleat engaging the opposite side of the pedal. Using spring-tempered steel allows the clamping mechanism itself to flex.

Figure 1:
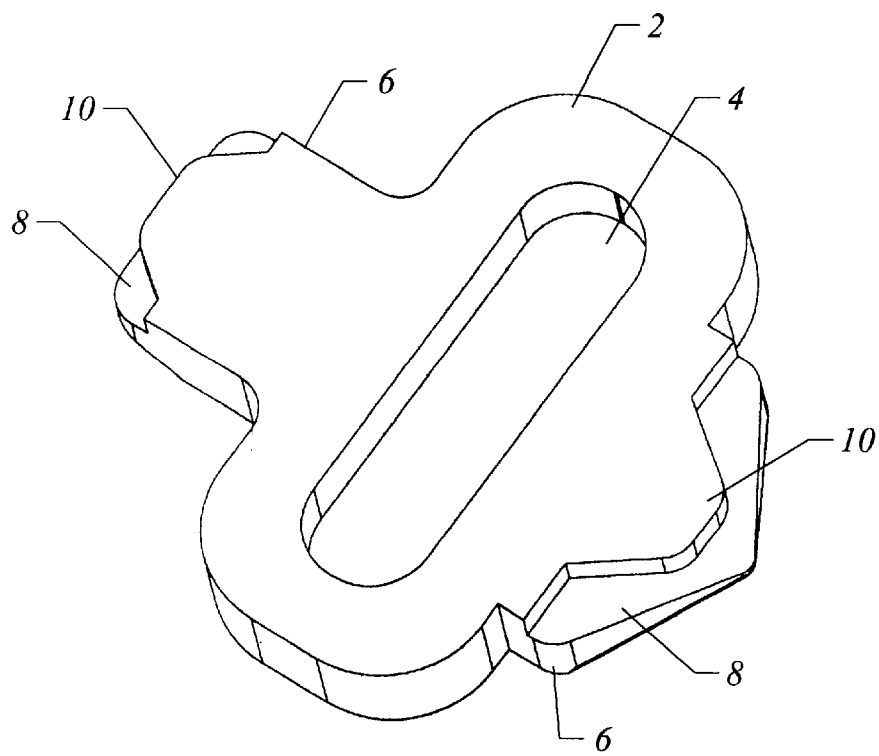
FIG. 1 is a perspective view of the top elements of the cleat to be used with the preferred embodiment of the subject pedal.

FIG. 1 shows an example of the SPD-type cleat that is presently preferred for use with one embodiment of the subject invention, viewing the surface of the cleat that faces the sole of the rider's shoe. Cleat 2 is generally made of a hard and strong material such as steel. It may be cast, forged or machined, or made by a combination of these techniques. The cleat includes a slot 4, through which two screws or bolts (not shown) are threaded into a threaded metal insert inside the shoe, thereby securing the cleat firmly to the sole of the shoe. Shoes having such threaded inserts and a sole configuration compatible with such cleats are well known and widely available.

The cleat has extensions 6 at the front and rear edges that are used to engage the SPD or other appropriate pedal mechanism. Each extension has recesses 8 which allow portions of the pedal mechanism to fit into said recessed area when the rider has inserted the cleat into the pedal. Each extension also has a tab 10 which fits into a corresponding recess in the mechanism of the pedal and prevents the cleat from being rotated relative to the pedal unless a force sufficient to overcome the spring has been applied.

Figure 2:
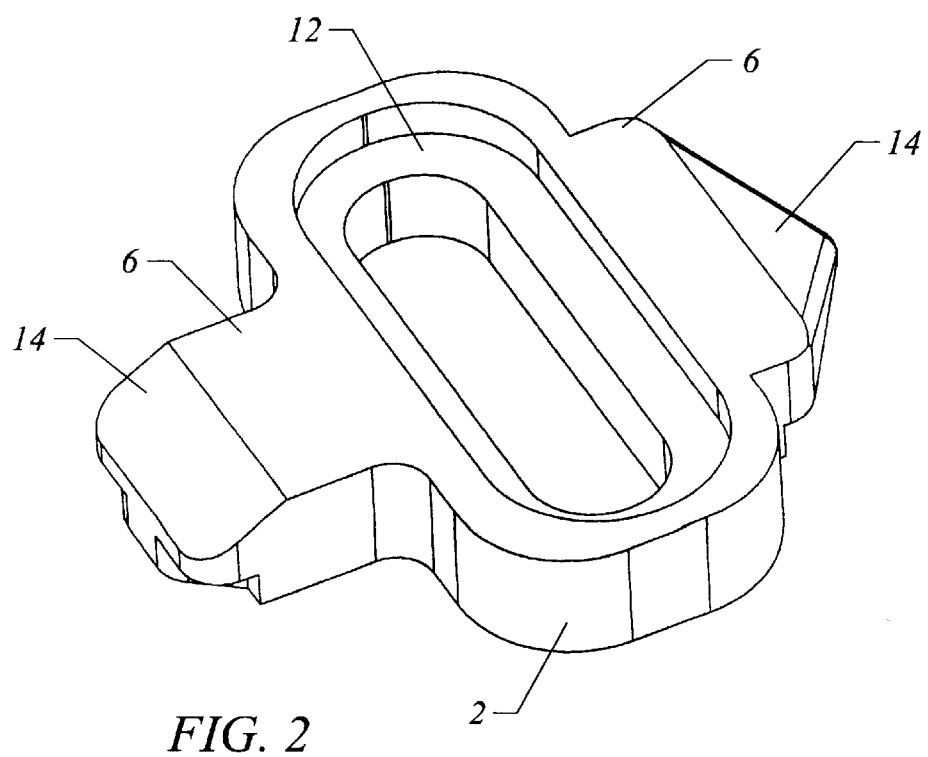
FIG. 2 is perspective view of the bottom elements of the cleat to be used with the preferred embodiment of the subject pedal.

FIG. 2 shows the same cleat embodiment from the bottom side. As is conventional and well-known in the art, recess 12 holds a two-holed washer (not shown) which helps to locate the two screw that hold the cleat to the shoe. Bevels or chamfers 14 on extensions 6 act as camming surfaces to open the SPD or other pedal mechanism when the cleat is pressed into the pedal. Face 16 faces the ground when walking and rests against the cleat plate of the pedal when the cleat is engaged inside the pedal mechanism.

FIG. 3 shows a perspective view of one presently preferred embodiment of the subject invention. Pedal 20 consists of spindle 22 for attaching the pedal to the crankarm of a bicycle. The spindle will generally be made of a steel alloy, although titanium or any other material having the necessary strength, hardness and ductility may also be used. Pedal body 24 holds the conventional bearings that permit the pedal to rotate on the spindle, and supports and allows attachment of spring plates 26a and 26b. Pedal body 24 can be made from a wide variety of materials including aluminum, magnesium, various plastics and polymers, or even steel. It can be made through forging, casting, injection molding, machining or other processes depending upon the material used and the properties required.

Spring plates 26a and 26b are preferably made of heat-treated steel, although other materials such as titanium having appropriate spring properties could be used. They are preferably manufactured by stamping from flat sheet-metal and formed to the final shape. Each of the spring plates 26a and 26b has recesses 27a and 27b in the engagement edges 30a and 30b for retaining tabs 10 in the cleat. In the preferred embodiment, spring plates 26a and 26b are identical parts, with one attached to the top and the other attached to the bottom of pedal body 24 with screws 28. At least a portion of the rider's weight and pedaling force is transmitted to the pedal through surface 29 of spring plate 26b. When the cleat 2 is engaged in the other side of the pedal, the cleat rests on the equivalent surface of spring plate 26a.

FIG. 4 is a side view of the pedal 20 showing the relationship of spring plates 26a and 26b with cleat 2. Spring plates 26a and 26b are formed so that they will interfit with each other in the manner shown in FIGS. 3 and 4. When cleat 2 is brought into the position shown, camming surfaces 14 press against the leading and trailing engagement edges 30a and 30b of spring plate 26a. Pressing camming surfaces 14 against engagement edges 30a and 30b causes the engagement edges 30a and 30b to be forced away from camming surfaces 14, allowing the mating surface 16 of the cleat to contact the mating surface 29 of spring plate 26b. When the cleat recesses 8 have reached the engagement edges 30a and 30b, the engagement edges will be forced by the spring tension inherent in these parts to return to their original positions, thereby capturing and retaining the cleat 2.

Depending upon the exact geometry of extensions 6 and recesses 8 of cleat 2, and engagement edges 30a and 30b of the spring plates, it will be very difficult or impossible to remove the cleat from the pedal by lifting or pulling the cleat straight upward. The preferred method of removing the cleat from the pedal will be to rotate the cleat about axis "A." This is accomplished when the rider twists his foot by turning his heel outward or inward. This allows cleat tabs 10 to push against corresponding recesses 27a and 27b, which forces the engagement edges to move outward, thereby allowing the cleat to be removed and the rider's shoe to thereby become disengaged from the pedal.

Figure 5:
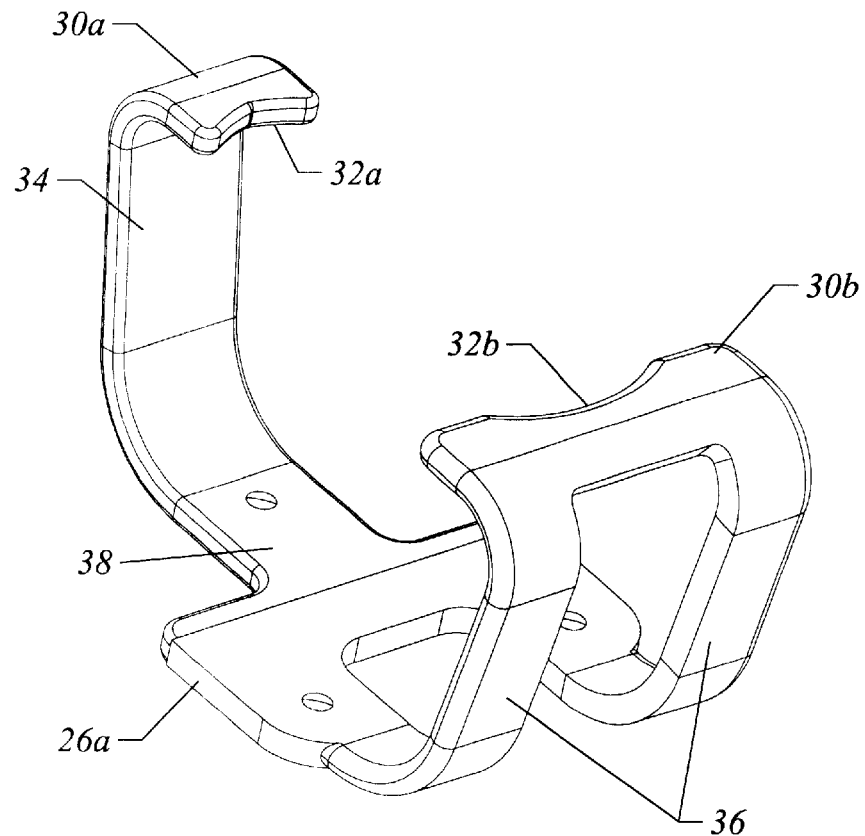
FIG. 5 is a perspective view of one of the spring plates used in the first embodiment.

FIG. 5 is a perspective view of spring plate 26a showing in greater detail a presently preferred configuration. The engagement edges 30a and 30b have recesses 32a and 32b into which cleat tabs 10 fit when the cleat is inserted into the pedal. In order to allow the spring plates to interfit, one end of the spring plate 34 is a single, relatively narrow arm 34, while the opposite end is branched into two arms 36, which are spaced sufficiently far apart to allow the single arm 34 from the equivalent spring plate 26b to fit between them. The spring rate of each spring plate is determined by a number of factors, including the thickness of the material, the modulus of the material used, and the geometry of the cleat plates. For instance, the further the plane of the engagement edges 30a and 30b extend above the plane where the cleat plate attaches to the pedal body 38, the longer the effective lever arm, and the lower the spring rate will be.

Figure 6:
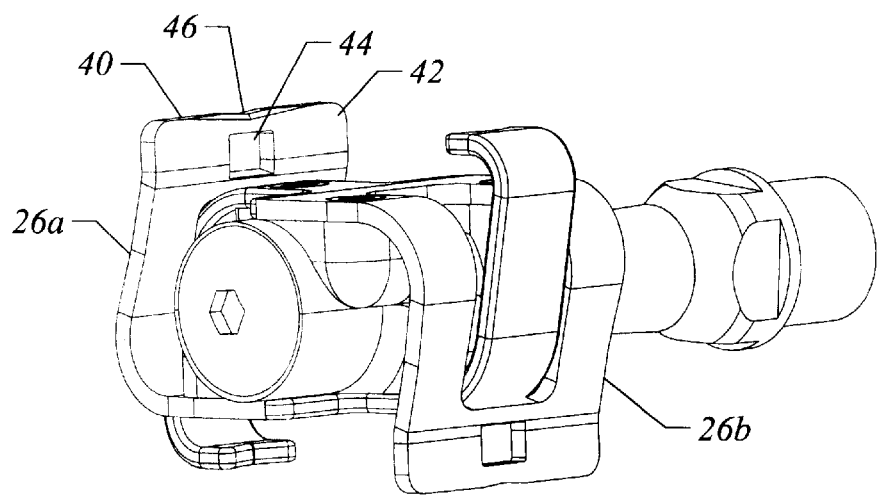
FIG. 6 is a perspective view of an alternate embodiment using a different clamping means.

FIG. 6 shows an alternate clamping mechanism. Spring plates 26a' and 26b' each have a revised engagement edge 40 which consists of a largely flat vertical plate 42 with a window 44 into which the engaging features of one end of the cleat are inserted. Chamfer or radius 46 assists the cleat in camming past the top edge of the spring plate and in locating the cleat extension in the window. Alternatively, both arms of each of spring plates 26a' and 26b' could be configured as largely flat vertical plates.

Figure 7:
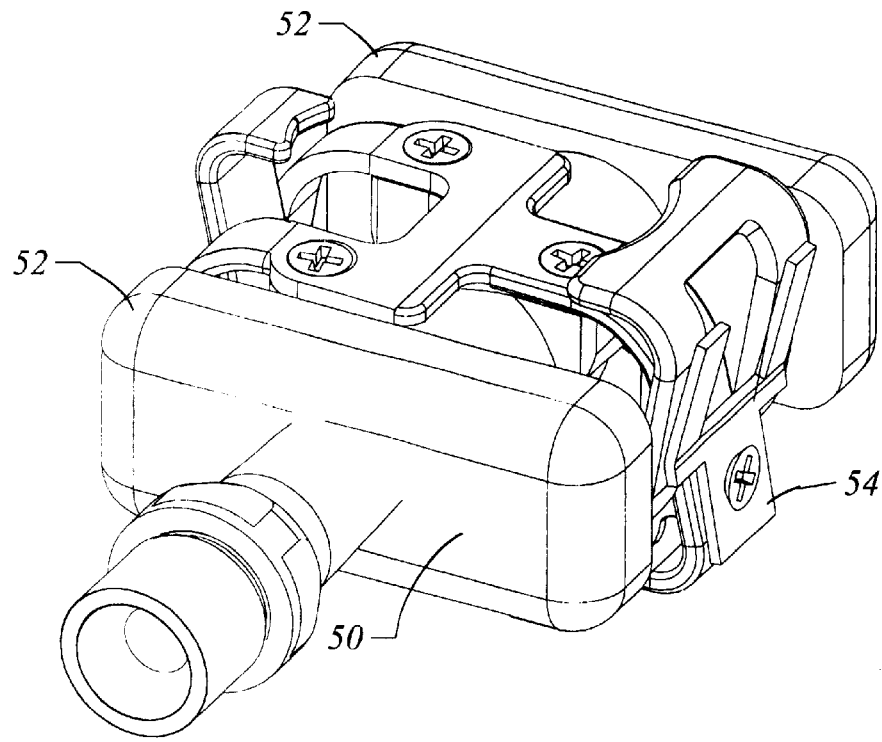
FIG. 7 is a perspective view of an alternate embodiment with adjustable spring tension.

FIG. 7 shows another alternate embodiment of the pedal. It includes a larger platform 50 with extensions 52 for supporting the rider's shoe. Also included are bolt-on tension plates 54 that may be added to increase the spring tension for riders who prefer higher spring tension for stronger retention. Each plate bolts to one of the cleat plates and is formed to press against the other cleat plate, thereby requiring the rider to overcome a higher spring rate in order to exit the pedal. The new spring rate is a combination of the rates of the two cleat plates, less any compliance in the tension plate. Thus by substituting different materials and different tension plate thicknesses, different combined spring rates can be achieved to suit the user.

Figure 8:
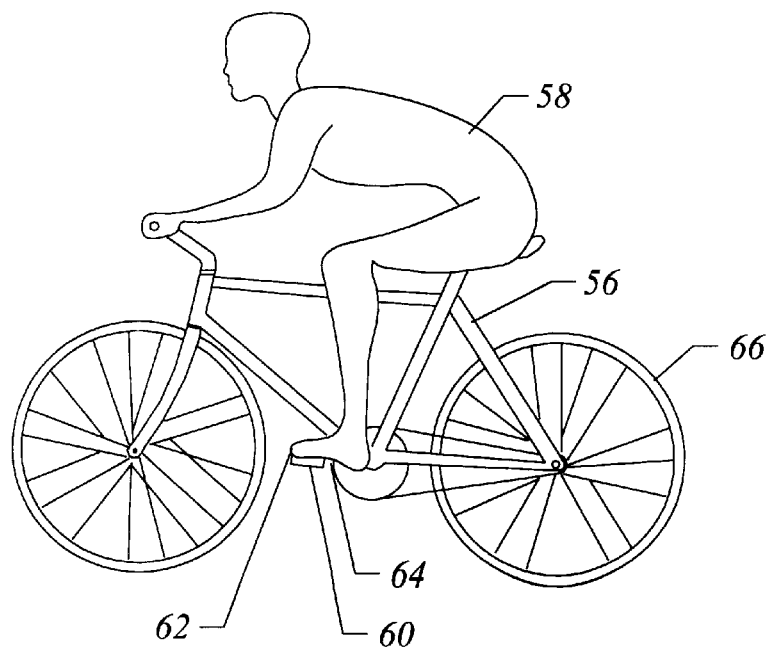
FIG. 8 is a side elevational view of a bicycle with a cleat and pedal system being used by a rider.

FIG. 8 shows a bicycle 56 and rider 58 employing the subject invention. Pedal 60 is attached at one end to a cleat (not visible) attached to the bottom of the rider's shoe 62. The other end of the pedal is attached to the crankarm 64, which is used to direct the force exerted by the rider to rear wheel 66, which translates that force into motion.

Because it reduces part count and complexity, the preferred embodiment of the subject design is both easier to manufacture and lighter than existing SPD-type pedal designs. Because the preferred embodiment of the subject design allows a more open design around the locking mechanism, it will function better in adverse conditions such as mud, dirt and snow. Because it allows true step-down entry, it is easier to use.

While particular embodiments of the present invention have been described, it is apparent that changes and modifications may be made without departing from the invention in its broader aspects and, therefore, the invention may be carried out in other ways without departing from the true spirit and scope. These and all other equivalents are intended to be covered by the following claims.

What is claimed is:

1. A clipless bicycle pedal system comprising:
   a cleat having front and rear edges and engagement portions at said front and rear edges such that said front and rear engagement portions are spaced from one another a first given distance;
   a pedal including a pedal body and at least one plate, the pedal body having an axis, a first side, and a second side generally opposite said first side, said first and second sides each defining a plane parallel to said axis, said planes being spaced from and on generally opposed sides of said axis;
   means attaching said plate to said first side of said pedal body;
   said plate having a central portion on said first side of said body and a plurality of arm portions, said arm portions extending away from said central portion toward said second plane, said arm portions each terminating in an end portion on said second side of said pedal body, said end portions being movable away from one another upon application of a given force, said arm portions extending away from said central portion such that at least two of said end portions are separated by a second distance that generally corresponds to said first given distance, said arm portions of said plate extending around said body so that said end portions capture said engagement portions of said cleat therebetween, thereby releasably holding the cleat to the pedal body and providing a step-in, twist out attachment of the cleat and pedal.

2. A clipless bicycle pedal system as in claim 1 in which said plate is made of a resilient material.

3. A clipless bicycle pedal system as in claim 1 in which said extensions are formed so as to allow the cleat to be inserted directly from above said plate, but allow said cleat to be removed from engagement with said extensions by twisting said cleat about an axis.

4. A clipless bicycle pedal system as in claim 1 in which there is a plurality of said plates, at least one of which includes a center portion proximate to said first plane with extensions formed on the front and rear of said plates, said extensions extending away from said first plane and formed to engage the front and rear edges of the cleat proximate to said second plane, and at least one of which includes a center portion in said second plane with extensions formed on the front and rear of said plates, said extensions extending away from said second plane and formed to engage the front and rear edges of the cleat proximate to said first plane.

5. A clipless bicycle pedal system as in claim 1 in which there is a plurality of said plates, each of which includes said extensions formed on the front and rear of said plates, said extensions extending away from said first plane and formed to engage the front and rear edges of the cleat.

6. A clipless bicycle pedal system as in claim 1 in which there are a plurality of said plates, each of which includes a center portion and extensions formed on the front and rear of said plates, said extensions extending away from said center portion through a plane horizontally bisecting said pedal body so as to form a means for engaging said cleat on the side of said pedal body opposite said plate and formed to engage the front and rear edges of the cleat.

7. A pedal for a bicycle for use with a cleat, the pedal including
   a pedal body having opposed sides, one being the top side and the other being the bottom side;
   a spring plate, the plate having a mid-portion and at least two arm portions, the arm portions being sized and shaped, relative to the pedal body, to when attached to the pedal body extend around the body and terminate in end portions generally opposed to one another, the end portions extending away from the pedal body sufficiently to receive on the side of said pedal body opposite said mid-portion a cleat attached to a bicycle rider's shoe; the resiliency of the spring plate being sufficient to hold the cleat to the pedal during normal pedaling of the bicycle; the end portions of the arms being shaped to cooperate with the cleat and to provide a step-in, twist out attachment of the cleat to the pedal, and
   attachment means to attach the spring plate to the body.

8. A pedal as set forth in claim 7 in which the end portions of said arms are shaped to cooperate with said cleat to permit the rider to step down on the pedal and engage said cleat with the pedal, and to disengage said cleat from the pedal by twisting said cleat relative to the pedal.

9. A pedal as set forth in claim 7 in which the arm portions of said spring plate consist of a pair of arms extending from one side and a single arm extending from the other, opposed side of the spring plate, said pair of arms being spaced from one another sufficiently to permit a single arm of a similar spring plate to pass between them.

10. A pedal as set forth in claim 9 in which there are two of said spring plates, one attached to one side of the pedal body, the other attached in the other side of the pedal body, such that the single arm of one spring plate extends between the pair of arms of the other spring plate.

11. A pedal as set forth in claim 7 including means to adjust the resiliency of the spring plate.

12. A pedal as in claim 7 in which the spring plate is generally C-shaped.

13. A pedal as in claim 7 in which the attachment means consist of threaded fasteners.

14. A bicycle having a frame, at least one wheel, a crank for driving the wheel, the crank having at least one pedal attached thereto, the pedal having a pedal body with opposed sides, one side being the first side and the other side being the second side, at least one spring plate, the plate having a mid-portion and two arm portions, the arm portions being sized and shaped, relative to the pedal body, to when said mid-portion is attached to the first side of said pedal body extend around the pedal body and terminate in two end portions on the second side of said pedal body generally opposed to one another, the end portions being spaced from the second side of the pedal body sufficiently to receive a cleat between the end portions and thereby to attach the pedal body to a bicycle rider's shoe, the resiliency of the spring plate being sufficient to hold the cleat to the pedal body during normal pedaling of the bicycle, the end portions of the arms being shaped to cooperate with the cleat and to removably attach the cleat to the pedal body, and attachment means to attach the spring plate to the pedal body.

15. A bicycle as set forth in claim 14 in which the end portions of the arms of the spring plate are shaped to cooperate with the cleat to permit the rider to step down on the pedal and engage the cleat with the pedal body, and to disengage the cleat from the pedal body by twisting the cleat relative to the pedal body.

16. A bicycle as set forth in claim 14 in which said arm portions of the spring plate comprise a pair of arms extending from one side and a single arm extending from the other, opposed side of the spring plate, the pair of arms being spaced from one another sufficiently to permit a single arm of a similar spring plate to pass between them.

17. A bicycle as set forth in claim 16 in which therefore two spring plates, one attached to one side of the pedal body, the other attached to the other side of the pedal body, the single arm of one spring plate extending between the pair of arms of the other spring plate.

18. A bicycle as set forth in claim 14 including means to adjust the resiliency of the spring plate.

19. A bicycle as set forth in claim 14 in which the spring plate is generally C-shaped.

* * * * *